US009523293B2

(12) United States Patent
Puetzer

(10) Patent No.: US 9,523,293 B2
(45) Date of Patent: Dec. 20, 2016

(54) INTERNAL COMBUSTION ENGINE AND METHOD FOR OPERATING AN INTERNAL COMBUSTION ENGINE

(71) Applicant: Ford Global Technologies, LLC, Dearborn, MI (US)

(72) Inventor: Jean-Philippe Puetzer, Hellenthal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/470,888

(22) Filed: Aug. 27, 2014

(65) Prior Publication Data

US 2015/0075489 A1    Mar. 19, 2015

(30) Foreign Application Priority Data

Sep. 19, 2013    (DE) ......................... 10 2013 218 773

(51) Int. Cl.
| F02B 31/00 | (2006.01) |
| F01L 3/20 | (2006.01) |
| F01L 3/06 | (2006.01) |
| F01L 3/12 | (2006.01) |
| F01L 3/16 | (2006.01) |
| F02M 35/10 | (2006.01) |
| F02M 23/00 | (2006.01) |

(52) U.S. Cl.
CPC .. F01L 3/20 (2013.01); F01L 3/06 (2013.01); F01L 3/12 (2013.01); F01L 3/16 (2013.01); F02B 31/00 (2013.01); F02M 23/006 (2013.01); F02M 26/05 (2016.02); F02M 26/06 (2016.02); F02M 35/10072 (2013.01); F02M 35/10222 (2013.01); F02B 2031/003 (2013.01); Y02T 10/146 (2013.01)

(58) Field of Classification Search
CPC ................. F01L 3/06; F01L 3/16; F01L 3/12; F02B 2031/003
USPC .......................... 123/308, 41.17, 41.34, 41.41
See application file for complete search history.

(56) References Cited

U.S. PATENT DOCUMENTS

| 1,873,119 A | * | 8/1932 | Griswold | ................... | F01L 3/16 |
| | | | | | 123/188.8 |
| 1,876,160 A | | 9/1932 | Zahodiakin | | |
| 2,063,779 A | * | 12/1936 | Baj | ........................... | F01P 3/14 |
| | | | | | 123/41.17 |

(Continued)

FOREIGN PATENT DOCUMENTS

| DE | 3223920 A1 | 12/1983 |
| DE | 102010024172 A1 | 12/2011 |

(Continued)

Primary Examiner — John Kwon
Assistant Examiner — James Kim
(74) Attorney, Agent, or Firm — Julia Voutyras; Alleman Hall McCoy Russell & Tuttle LLP

(57) ABSTRACT

An intake system for an internal combustion engine is provided. The intake system may include an intake manifold fluidly connected to a cylinder, an intake valve coupled to the cylinder having an air supply duct longitudinally extending through a portion of a valve stem and having an outlet opening into the intake manifold and an inlet fluidly connected to a supply line fluidly connected to an intake passage downstream of a compressor and upstream of a throttle, and a shut-off valve positioned in the supply line configured to adjust the flow of gas through the supply line.

17 Claims, 5 Drawing Sheets

(56) References Cited

U.S. PATENT DOCUMENTS

| | | | | | |
|---|---|---|---|---|---|
| 3,382,850 | A | * | 5/1968 | Baudry | F01L 3/06 123/259 |
| 4,058,091 | A | * | 11/1977 | Tanahashi | F02M 57/04 123/188.7 |
| 4,196,701 | A | * | 4/1980 | Tamura | F02B 31/08 123/188.11 |
| 4,286,561 | A | * | 9/1981 | Tsutsumi | F02B 31/08 123/308 |
| 5,322,043 | A | * | 6/1994 | Shriner | F02B 17/00 123/295 |
| 5,617,835 | A | * | 4/1997 | Awarzamani | F01L 3/20 123/188.7 |
| 6,138,616 | A | * | 10/2000 | Svensson | F01L 3/24 123/188.2 |
| 2009/0223498 | A1 | * | 9/2009 | Shieh | F02M 25/06 123/574 |
| 2010/0229826 | A1 | * | 9/2010 | Engineer | F01L 3/06 123/296 |
| 2011/0132337 | A1 | * | 6/2011 | Lupescu | F01N 3/0835 123/568.21 |

FOREIGN PATENT DOCUMENTS

| | | | |
|---|---|---|---|
| EP | 0094002 | A1 | 11/1983 |
| FR | 2584139 | A1 | 1/1987 |
| WO | 2006024551 | A1 | 3/2006 |

\* cited by examiner

INTERNAL COMBUSTION ENGINE AND METHOD FOR OPERATING AN INTERNAL COMBUSTION ENGINE

CROSS REFERENCE TO RELATED APPLICATIONS

The present application claims priority to German Patent Application No. 102013218773.4, filed Sep. 19, 2013, the entire contents of which are hereby incorporated by reference for all purposes.

FIELD

The present disclosure relates to a system and method for routing gases through a passage in a valve stem.

BACKGROUND AND SUMMARY

Internal combustion engine utilize intake systems to provide intake air to cylinders in the engine. Improved mixing of the intake air with fuel in the cylinder may be desirable to enable an increase in engine efficiency and decreased engine emissions. Specifically, turbulent flow of the intake air may be generated to improve mixing in the cylinders in the engine. However, generating turbulence in the intake system increases losses in the intake system, decreasing engine efficiency and subverting the aforementioned objective of increased efficiency. Engine packaging constraints may also affect the generation of a flow pattern for improved mixing the intake air and fuel in the cylinder.

As such in one approach to overcome at least some of the aforementioned problems, an intake system for an internal combustion engine is provided. The intake system may include an intake manifold fluidly connected to a cylinder, an intake valve coupled to the cylinder having an air supply duct longitudinally extending through a portion of a valve stem and having an outlet opening into the intake manifold and an inlet fluidly connected to a supply line fluidly connected to an intake passage downstream of a compressor and upstream of a throttle, and a shut-off valve positioned in the supply line configured to adjust the flow of gas through the supply line. In this way, intake air is flowed through the valve stem which mixes with air flowing through the intake manifold to generate turbulence (e.g., swirling) in the intake air flow immediately before the air enters the cylinders. As a result, combustion efficiency is increased and engine emissions are reduce while losses in the intake system are not significantly increased due to the location convergence of the intake air streams which is adjacent to the intake opening of the cylinder.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
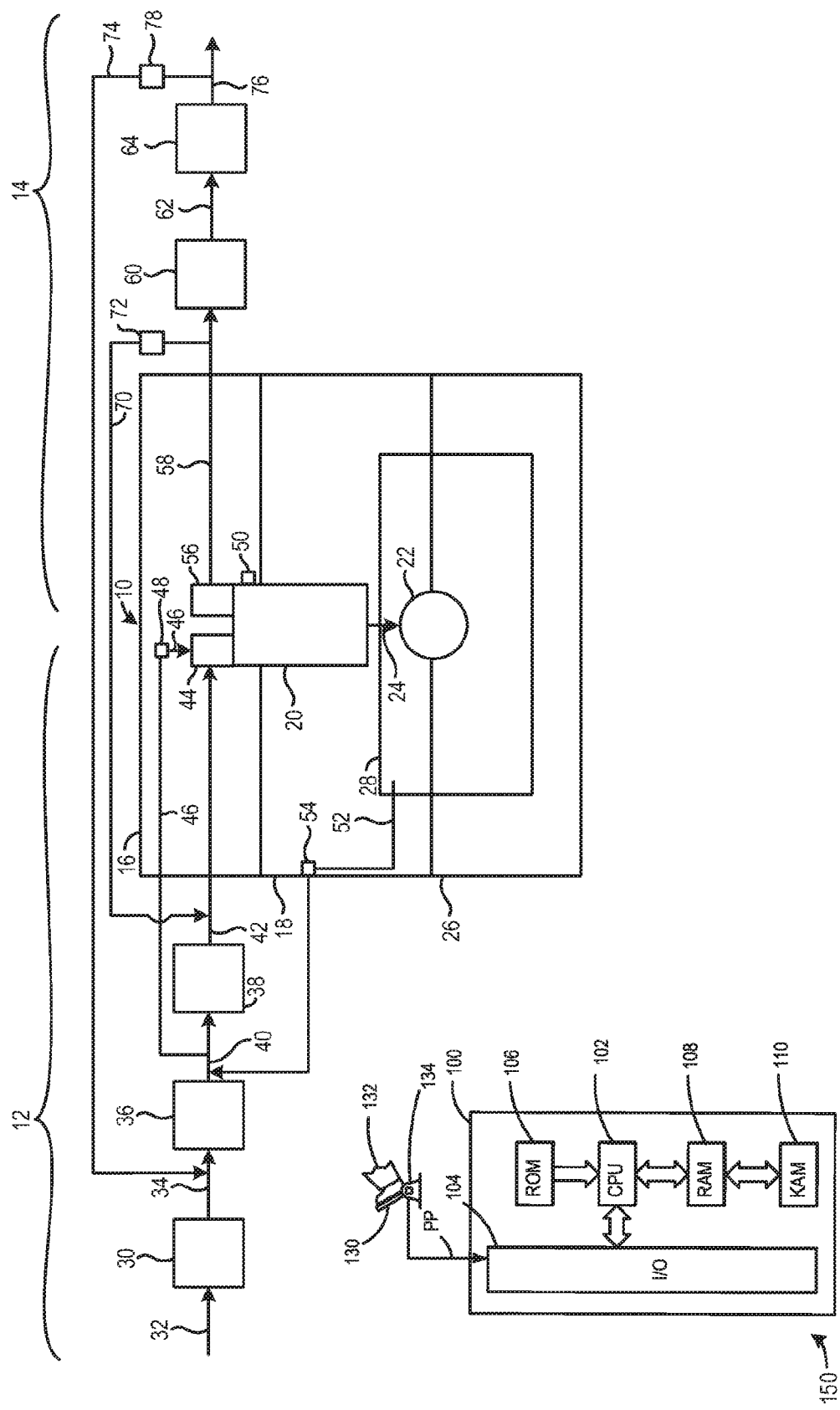
FIG. 1 shows a schematic depiction of an internal combustion engine and internal combustion engine system.

An internal combustion engine is described herein. The internal combustion engine may include at least one cylinder head and at least one cylinder which has at least one inlet opening fluidly connected to an intake system configured to generate charge air, and a valve assembly comprising a lifting valve for each inlet opening and comprising a valve actuating device for actuating the at least one lifting valve, which valve actuating device comprises at least one overhead camshaft with at least one cam, where each lifting valve has a valve stem, on whose end facing toward the cylinder there is arranged a valve head corresponding to the inlet opening and whose other end faces toward the valve actuating device and which is mounted so as to be displaceable in translational fashion in a bushing-like valve stem guide such that the valve, when actuated and during rotation of the camshaft, performs an oscillating lifting movement in the direction of its longitudinal axis between a valve closed position and a valve open position so as to open up and close off the inlet opening.

Additionally, a method for operating an internal combustion engine is described herein. An internal combustion engine of the above-stated type may be used for example as a drive for a motor vehicle. Within the context of the present description, the expression "internal combustion engine" encompasses diesel engines, Otto-cycle engines and also hybrid internal combustion engines, that is to say internal combustion engines which are operated with a hybrid combustion process and/or internal combustion engines which have an electric machine which can be connected in terms of drive to the internal combustion engine and which absorbs power from the internal combustion engine or outputs additional power.

The internal combustion engine may include a cylinder block and at least one cylinder head which are connected to one another to form the cylinders, that is to say the combustion chambers, for which purpose bores may be provided in the cylinder head and in the cylinder block. The cylinder head may serve for accommodating the valve assembly desired for the charge exchange. During the course of the charge exchange, the discharge of the combustion gases by the exhaust line may take place via the at least one outlet opening, and the feed of the charge air via the intake line takes place via the at least one inlet opening of the cylinder. Here, at least parts of the at least one intake line or of the at least one exhaust line are integrated in the cylinder head. According to the prior art, in four-stroke engines, for the control of the charge exchange, use is made virtually exclusively of lifting valves which are movable along their longitudinal axis between a valve closed position and a valve open position and which, during the operation of the internal combustion engine, perform an oscillating lifting movement in order to open up and shut off the inlet and outlet openings.

The actuating mechanism, including the valves, is referred to as the valve assembly. Here, the valve assembly may be configured to open and shut off the inlet and outlet openings of the cylinders at the desired times, with a fast opening of large flow cross sections being sought in order to keep the throttling losses in the inflowing and outflowing gas flows low and in order to provide improved charging of the cylinder, and an effective (e.g., complete) discharge of the combustion gases, in one example.

To actuate a valve, a valve spring is firstly provided in order to preload the valve in the direction of the valve closed position, and a valve actuating device is secondly provided in order to open the valve counter to the preload force of said valve spring.

The valve actuating device may include at least one camshaft with a cam for each valve and, for each valve, at least one cam follower element which may be arranged in the force flow between the camshaft and the associated valve.

Within the context of the present description, intermediate elements of the valve actuating device, that is to say valve assembly components that are situated, that is to say arranged, in the force flow between cam and valve, may be designated as cam follower elements, that is to say are summarized under said expression.

In one example, for the inlet valves and the outlet valves, there may be provided in each case one camshaft which may be set in rotation by the crankshaft for example via a traction mechanism drive, such that the camshaft, and the cams together therewith, rotate at half of the rotational speed of the crankshaft. Here, a distinction may be made between an underlying camshaft and an overhead camshaft, wherein the reference point for these designations is the parting plane between the cylinder block and the cylinder head.

Overhead camshafts may be used for actuating overhead valves in the engine. An overhead camshaft may be accommodated by the cylinder head, for which purpose bearings or bearing blocks may be provided.

The above statements make it clear that the configuration of a cylinder head may significantly co-determined and influenced by the elements or components for the charge exchange, wherein it is firstly desirable to provide charge exchange ducts, specifically intake lines for the feed of the charge air or of the fresh mixture and exhaust lines for the discharge of the combustion gases, and secondly, a valve assembly may be provided for controlling the charge exchange, which valve assembly comprises the valves and the valve actuating device.

Here, it may be taken into consideration in particular that the elements or components cannot be arranged in an arbitrary manner in or on the cylinder head, and a purposely selected arrangement and design of the inlet and outlet openings may be provided, in particular of the charge exchange ducts. Specifically, the geometry of the inlet ducts, that is to say of the intake lines, may have a significant influence on the charge movement and thus on the mixture formation, in particular in the case of direct-injection internal combustion engines.

For example, the generation of a so-called tumble or swirling flow can accelerate and assist the mixture formation. A tumble is an air vortex about an imaginary axis which runs parallel to the longitudinal axis of the crankshaft, by contrast to a swirl, which constitutes an air vortex whose axis runs parallel to the piston or cylinder longitudinal axis.

A problem with regard to a restricted installation space in and on the cylinder head is intensified by the fact that concepts for internal combustion engines may provide four or five valves per cylinder, which a corresponding number of cylinder openings and charge exchange ducts are provided.

In the case of applied-ignition internal combustion engines, it may be desirable for the ignition apparatus, and additionally the injection device in particular in the case of direct-injection internal combustion engines, to be arranged in the cylinder head. For this purpose, it may be desirable to not just to provide the desired installation space. In fact, for increasing the mixture formation and of the combustion process, it may be sought to realize a particular arrangement of the ignition apparatus and of the injection device in the combustion chamber and relative to one another.

Accordingly, in the case of direct-injection internal combustion engines, an injection jet directed counter to the tumble may desirable to achieve an extensive distribution of the fuel throughout the entire combustion chamber. Therefore, corresponding positioning of the injection nozzle may be provided. Furthermore, the valves, ignition apparatus, and/or the injection apparatus may be accessible for assembly purposes.

If the internal combustion engine has a liquid-type cooling arrangement, multiple coolant ducts may be provided in the cylinder head, which coolant ducts conduct the coolant through the cylinder head. The arrangement of coolant ducts may lead to an extremely complex structure of the cylinder head construction. Here, the mechanically and thermally highly loaded cylinder head may be weakened in terms of its strength as a result of the provision of the coolant ducts. Secondly, the heat may not firstly be conducted to the cylinder head surface to be dissipated, as is the case with the air-type cooling arrangement. Owing to the significantly higher heat capacity of a liquid in relation to air, greater amounts of heat may be dissipated by means of a liquid-type cooling arrangement, for which reason, in practice, liquid-type cooling is of significantly greater relevance than air-type cooling, because the thermal loading of engines is increasing.

The individual demands, discussed above, that are derived from the respective components and their function have an interaction with one another, such that, for example, an increase of the inlet ducts with regard to mixture formation and charge exchange may not be achieved in a desired manner. However, even if the geometry of the inlet ducts can be or is desirably configured with regard to the charge movement and/or the mixture formation, disadvantages arise with regard to the charge exchange. It must be taken into consideration here that, to generate a tumble or a swirl, the inlet ducts are equipped or formed with flow-guiding elements, for example with flow-guiding surfaces, which not only generate the desired charge movement but also lead to a pressure loss in the inducted charge air or in the inducted fresh mixture, because the flow-guiding elements constitute, from a flow aspect, resistances which divert and coercively guide the charge-air flow and which thus prevent an unhindered flow through the intake lines.

The pressure losses associated with the generation of a tumble or of a swirl lead to an impairment of the charging of a cylinder, that is to say to a reduced cylinder fresh charge. Like the throttling losses of an Otto-cycle engine in part-load operation, the pressure losses may be thermodynamically disadvantageous.

It is an objective of the present description to provide an internal combustion engine which provides turbulence and mixing in the intake gas entering a cylinder in the engine.

A method is also provided for control of an internal combustion engine to provide turbulence and mixing in the intake gas entering a cylinder in the engine.

To achieve the aforementioned objective an internal combustion engine is provided. The internal combustion engine may include at least one cylinder head and at least one cylinder which has at least one inlet opening for the feed of the charge air via an intake system, and a valve assembly comprising a lifting valve for each inlet opening and comprising a valve actuating device for actuating the at least one lifting valve, which valve actuating device comprises at least one overhead camshaft with at least one cam, where each lifting valve has a valve stem, on whose end facing toward the cylinder there is arranged a valve head corresponding to the inlet opening and whose other end faces toward the valve actuating device and which is mounted so as to be displaceable in translational fashion in a bushing-like valve stem guide such that the valve, when actuated and during rotation of the camshaft, performs an oscillating lifting movement in the direction of its longitudinal axis between a valve closed position and a valve open position so as to open up and close off the inlet opening and where in the valve stem of at least one valve, there is provided an air supply duct which extends in a main section along the longitudinal axis of the valve, wherein, at a cylinder-side end of the air supply duct, at least one rectilinear section branches off and emerges from the valve, and the air supply duct is, toward an end facing away from the cylinder, fluidly connected to the intake system via a line.

In one example the internal combustion engine includes, at the inlet side, at least one line configured to enable charge air can be introduced into an air supply duct. The air supply duct itself is provided in the valve stem of a valve and serves for the generation of turbulence in the intake line, that is to say of a charge movement. For this purpose, at least one section of the air supply duct branches off from a main section of the air supply duct at the cylinder-side end and emerges from the valve or the valve stem. Upstream, toward the end facing away from the cylinder, that is to say toward the end facing toward the valve actuating device, the air supply duct is or can be connected to the intake system via the line mentioned in the introduction.

In another example, a separate duct may be used for generating a charge movement, such that the inlet duct no longer needs to perform this task and can be configured and designed with regard to a substantially unhindered feed of charge air or fresh mixture with reduced losses (e.g., without pressure losses).

In one example, the internal combustion may be configured to enable increased mixing of airflow through an airflow duct and an intake line.

A lifting valve may be used for accommodating an air supply duct because the stem of the lifting valve extends rectilinearly along the longitudinal axis of the valve and therefore advantageously offers the possibility of accommodating or forming a likewise rectilinear air supply duct.

In one example an overhead camshaft may be provided in the engine. The overhead camshaft may be advantageous because, owing to the omission of the push rod, the moving mass of the valve assembly is reduced, and the valve assembly is made more rigid, that is to say less elastic. In one example, an inlet camshaft for the at least one inlet valve and also an outlet camshaft for the at least one outlet valve are provided in the engine.

In another example at least two sections branch off from the main section of the air supply duct in the internal combustion engine. It may be then possible for the duct that generates the turbulence in the intake line to be provided and designed in accordance with a symmetrical pattern in the valve.

In another example, the section of the air supply duct that branches off from the main section of the air supply duct may be of rectilinear form in the internal combustion engine. The rectilinear design of the at least one duct has numerous advantages. Firstly, a duct of said type can be formed into the valve or the valve stem in a simple manner, for example by drilling, whereby production is simplified. Secondly, the air jet emerging from the duct can have a high level of impetus imparted thereto, which assists the generation of turbulence in a particularly advantageous way.

In another example, the section of the air supply duct that branches off from the main section of the air supply duct may be oriented toward the valve head, such that the duct forms an acute angle with the longitudinal axis of the valve, in the internal combustion engine. Both in the duct and also in the air supply duct running along the longitudinal axis of the valve, the angle may be defined proceeding from the respectively present flow direction. In the present case, the air jet emerging from the at least one duct is not basically directed counter to the flow in the intake duct.

The at least one duct may branch off from the air supply duct, and/or emerge from the valve, both in the region of the valve stem and also in the region of the valve head. With regard to embodiments of the type in question, in which the duct forms an acute angle with the longitudinal axis of the valve, it may be particularly advantageous for the section of the air supply duct that branches off from the main section of the air supply duct, and emerge from the valve, in the region of the valve stem. The duct may then be designed and arranged such that the virtual projection of the duct runs past the valve head.

Embodiments of the internal combustion engine are advantageous in which the at least one duct that branches off from the air supply duct is oriented away from the valve head, such that the duct forms an obtuse angle with the longitudinal axis of the valve. That which has already been stated above applies with regard to the angle. In the present case, the air jet emerging from the at least one duct is basically directed counter to the flow in the intake duct, whereby the generation of turbulence is assisted in a particularly advantageous manner.

In one example, the at least one section may branch off from the main section, and/or emerge from the valve, both in the region of the valve stem and also in the region of the valve head. With regard to embodiments of the type in question, in which the duct forms an obtuse angle with the longitudinal axis of the valve, it may be advantageous, from a strength aspect, for the at least one section to branch off from the main section in the region of the valve head and emerge from the valve in the region of the valve stem or valve head.

In another example, a shut-off element is provided in the line in the internal combustion engine. The shut-off element serves for activating charge movement, that is to say for opening up the line and supplying charge air originating from the intake system to the air supply duct. In this way, allowance is made for the fact that a charge movement may not be desired at all operating points of the internal combustion engine. Furthermore, via the shut-off element, the charge-air flow rate introduced into the air supply duct via the line can be controlled, that is to say metered, and the impetus of the air jet emerging from the air supply duct can also be adjusted.

In another example, a throttle flap is arranged in the intake system and the line branches off from the intake system upstream of the throttle flap. The throttle flap may be a throttle valve, in one example.

There may be various reasons for the arrangement of a throttle flap in the intake system. In the case of Otto-cycle engines, the throttle flap may be used for the purpose of quantity regulation. By adjusting a throttle flap which is provided in the intake system, the pressure of the inducted air downstream of the throttle flap can be reduced to a greater or lesser extent. The further the throttle flap is closed, that is to say the more the flap blocks the intake system, the higher the pressure loss of the inducted air across the throttle flap, and the lower the pressure of the inducted air downstream of the throttle flap and upstream of the inlet into the cylinder. For a constant combustion chamber volume, it is possible in this way for the air mass, that is to say the quantity, to be set by means of the pressure of the inducted air.

The arrangement of a throttle flap in the intake system may however also be expedient in the case of diesel engines, for example in order to throttle or shut off the feed of air, in one example.

If a throttle flap is arranged in the intake system, the line may branch off from the intake system upstream of the throttle flap, because then, the pressure gradient across the throttle flap can be utilized as a driving force for the delivery of the charge air to be conducted via the line. The pressure prevailing upstream of the throttle flap in the intake system prevails at the inlet to the line, whereas the pressure that prevails at the end of the line, or at the end of the air supply duct to which a supply is to be provided, may be approximately the same as that prevailing downstream of the throttle flap.

In another example, a filter is arranged in the intake system and the line branches off from the intake system downstream of the filter in the internal combustion engine. The inducted charge air may be fed to an air filter chamber of the internal combustion engine, in which the air flows through a filter in order to be purified. The inducted and purified charge air subsequently flows through the intake system and possibly passes an air mass sensor and a throttle flap before the charge air flows into the individual cylinder.

In one example, the bushing-like valve stem guide may have at least one passage, wherein the line is at least connectable via said at least one passage to the air supply duct.

If the valve, and with the latter the valve stem, performs only an oscillating movement along the longitudinal axis, and in particular does not rotate about the longitudinal axis, when actuated by the rotating camshaft, a single passage in the static valve stem guide may be provided in order for charge air from the line or from the intake system to be supplied to the air supply duct via said one passage. Here, a connecting duct is provided in the valve stem, which connecting duct connects the air supply duct to the passage.

However, the valve may rotate as it is actuated by the rotating camshaft. The reasons are as follows. If a tappet is used, said tappet is mounted on that end of the lifting valve which faces toward the valve actuating device, such that the tappet participates in the oscillating lifting movement of the valve if the cam is in engagement with the tappet and the cam slides, by way of its cam shell surface, along a contact line on the surface of the tappet. To facilitate the sliding and reduce (e.g., minimize) the wear of both components, the contact zone between the cam and tappet is supplied with lubricating oil. The wear of cam and tappet is disadvantageous not only with regard to the service life of said components but also in particular with regard to the functionality of the valve assembly, because material abrasion may have an influence on the valve play, the valve lift and the control timing. To counteract the wear of tappet and cam, the cam and the tappet may be arranged relative to one another such that the central plane of the cam which runs perpendicular to the axis of rotation of the cam is arranged so as to be offset, by an eccentricity, with respect to the longitudinal axis of the tappet. Said eccentricity has the effect that the tappet rotates about its longitudinal axis when the cam, by way of its cam shell surface, is in engagement with the tappet along a contact line.

For the reasons stated above, embodiments of the internal combustion engine may be provided in which the bushing-like valve stem guide is formed in two parts, wherein the two valve stem guide parts are arranged spaced apart from one another such that an annular duct running around the valve stem is formed, wherein the line opens into said annular duct.

If the valve and, together with the latter, the valve stem rotate about the longitudinal axis of the valve when actuated by the rotating camshaft, the annular duct enables the air supply duct to be arranged in the co-rotating valve stem and is, via a connecting duct that is likewise provided in the valve stem, connected permanently, that is to say without interruption, to the line and to the intake system via the annular duct.

The annular duct may basically also be arranged in the valve stem. It may not then be desired for the valve stem guide to be formed in two parts. Rather, a single-piece valve stem guide with a single passage, as described above, may be provided for the supply of charge air from the line or from the intake system to the air supply duct via the annular duct and said one passage. Problems may however arise with regard to the strength of the valve stem, for which reason the annular duct may be formed into the valve stem guide. Here, embodiments of the engine may also be provided in which the valve stem guide may be formed in one piece and the annular duct is situated in the shell surface of the inner wall. It may then additionally be desirable for a passage to be provided which connects the annular duct to the line, in one example. At the valve stem side, a connecting duct that is provided in the valve stem connects the annular duct to the air supply duct.

Embodiments of the internal combustion engine may be provided in which each valve is equipped with a valve spring which preloads the valve in the direction of the valve closed position. Here, embodiments of the engine may be provided in which the valve spring is a helical spring.

Embodiments of the internal combustion engine may be provided in which at least one cam follower element is provided for each valve, wherein each cam follower element is arranged in the force flow between the camshaft and the associated valve.

In this context, embodiments of the internal combustion engine may be provided in which the at least one cam follower element for each valve is a tappet. A tappet may for example be implemented in simple form as a hydraulically activatable cam follower element which is charged with oil pressure in order for the then activated tappet, as the cam follower element situated in the force flow, to transmit forces from the cam to the valve, or which is separated from the oil pressure in order, in the deactivated state, to reduce (e.g., prevent) the transmission of force from the cam to the valve.

The at least one cam follower element may also be a rocker arm or an oscillating lever. Through the use of levers, adequate installation space may be made available for the arrangement of the valve assembly in the cylinder head.

Embodiments of the internal combustion engine may be provided in which a ventilation line opens into the intake system. To dissipate the pressure in the crankcase, a ventilation line may be provided for the ventilation of the crankcase. The background to this measure is that some of the combustion gases or the combustion air passes out of the cylinders into the crankcase and generates a pressure increase therein. Aside from this so-called blow-by, some of the injected fuel also passes into the crankcase.

Some of the oil situated in the crankcase may mix, in the form of a fine oil mist, with the gases situated in the crankcase, for which reason the ventilation stream extracted from the crankcase is contaminated with oil and may be supplied to an oil separator. The separated-off oil may be returned into the crankcase, whereas the purified ventilation stream may be supplied to the intake system of the internal combustion engine in order to be fed, with additional charge air, to the cylinder and participate in the combustion. It may not be desirable for the ventilation stream to be introduced into the environment owing to the contamination of the ventilation stream with combustion gases and possibly small oil particles.

Embodiments of the internal combustion engine may be provided in which the ventilation line opens into the intake system upstream of a point at which the line branches off from the intake system. A part of the ventilation stream then flows together with the charge air through the line, the passage and/or the annular duct and the air supply duct, wherein the oil particles contained in the ventilation stream lubricate the valve stem guide. It may be possible for lubrication of the valve stem guide by way of the valve actuating device to be dispensed with, if desired.

Specifically in one example, the valve assembly may be supplied with oil for the purpose of lubrication, for which purpose supply bores for the lubrication of the valve assembly are provided in the cylinder head, such that oil is generally available, and said oil may be also used for the lubrication of the valve stem guide. In such an example, the oil may be delivered from the valve assembly to the valve stem guide under the force of gravity, that is to say passive lubrication may be provided. By contrast, the lubrication of the valve stem guide with oil particles contained in the ventilation stream is targeted, that is to say active.

A method for operating an internal combustion engine is also provided. The method may include opening a shut-off element in a line fluidly connected to an air supply duct extending through a valve stem in an intake valve, the air supply duct opening into an intake line fluidly connected to a cylinder. That which has already been stated with regard to the internal combustion engine described may also apply to the method described herein.

FIG. 1 shows a schematic depiction of an internal combustion engine 10, intake system 12 supplying air to the engine 10, and an exhaust system 14 receiving exhaust gas from the engine. It will be appreciated that the engine 10 may be included in a vehicle.

The engine 10 may include a cylinder head 16 coupled to a cylinder block 18 forming a cylinder 20. It will be appreciated that the engine may include a plurality of cylinders, in other examples. The engine 10 is configured to perform cyclical combustion operation in the cylinder 20. Energy generated via combustion operation in the cylinder may be transferred to a crankshaft 22 to rotate the crankshaft. This transfer of energy is denoted via arrow 24. It will be appreciated that this transfer of energy may be implemented via connecting rods and/or other suitable mechanical components.

The engine 10 further includes a lubricant reservoir 26 (e.g., oil pan) coupled to the cylinder block 18 and a crankcase 28. It will be appreciated that the crankcase 28 may receive blow-by gases from the cylinder 20.

The intake system 12 includes an air filter 30 receiving air from an intake passage 32. An intake passage 34 provides fluidic connection between the air filter 30 and a compressor 36. The compressor 36 is fluidly connected to a throttle 38 via an intake passage 40. An intake passage 42 provides fluidic connection between the throttle 38 and an intake valve 44. The intake passage 42 may be an intake manifold. The intake valve 44 is coupled to the cylinder 20. The intake valve 44 is configured to open and close to permit and inhibit intake air from flowing into the cylinder 20. A supply line 46 is fluidly connected to an air supply duct in the intake valve 44, discussed in greater detail herein with regard to FIG. 2, and is fluidly connected to the intake passage 40 at a point downstream of the compressor 36 and upstream of the throttle 38. However, in other example the supply line may include an inlet coupled to the intake system at a point downstream of the compressor and the throttle. It will be appreciated that the supply line 46 includes an outlet in fluidic connection (e.g., direct fluidic connection) with the air supply duct extending through a stem in the intake valve. The supply line 46 and air supply duct increase the turbulence (e.g., swirling) in the air entering the cylinder to promote mixing of intake air with injected fuel.

A shut-off valve 48 is coupled to the supply line 46 and is configured to adjust the flow of gas through the supply line 46. Additionally, a direct injector 50 is coupled to the cylinder 20 and is configured to provide fuel directly to the cylinder. Additionally or alternatively a port injector may be provided in the engine.

A ventilation line 52 extends from the crankcase 28 to the intake system 12 and enables crankcase gas to be flowed to the intake system. The ventilation line 52 opens into the intake passage 40 at a location downstream of the compressor 36 and upstream of the throttle 38. However, other locations of the ventilation line outlet have been contemplated. A ventilation valve 54 is coupled to the ventilation line 52 and is configured to adjust the flow of crankcase gas through the ventilation line.

The engine 10 further includes an exhaust valve 56 coupled to the cylinder 20. The exhaust valve 56 may be included in the exhaust system 14. The exhaust system 14 may further include an exhaust passage 58 (e.g., exhaust manifold) is coupled to the exhaust valve and a turbine 60. The turbine 60 and the compressor 36 may be rotationally coupled to one another and included in a turbocharger. The exhaust system 14 may further include an exhaust passage 62 coupled to the turbine 60 and an emission control device 64. Exhaust gas from the emission control device may flow to downstream components such as a muffler, tailpipe, etc., and then to the surrounding environment.

A high pressure (HP) exhaust gas recirculation (EGR) passage 70 is also shown in FIG. 1. The HP-EGR passage 70 is coupled to the exhaust passage 58 and the intake passage 42. An HP-EGR valve 72 is coupled to the HP-EGR passage 70 and configured to regulate the flow of EGR gas therethrough.

A low pressure (LP) EGR passage 74 is also shown in FIG. 1. The LP-EGR passage 74 is coupled to an exhaust passage 76 downstream of the emission control device 64 and the intake passage 34. An LP-EGR valve 78 is coupled to the LP-EGR passage 74 and configured to regulate the flow of EGR gas therethrough. In other examples, HP and/or LP EGR passages may not be provided in the engine.

Controller 100 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 100 may receive various signals from sensors coupled to engine 10, in addition to those signals previously discussed, including measurement of inducted mass air flow (MAF); engine coolant temperature (ECT); a profile ignition pickup signal (PIP); throttle position (TP) from a throttle position sensor; and absolute manifold pressure signal, MAP. Engine speed signal, RPM, may be generated by controller 100 from signal PIP. The controller 100 may also be configured to control operation of the throttle 38, the HP-EGR valve 74, the LP-EGR valve 78, the ventilation valve 54, direct injector 50, and the shut-off valve 48. Therefore, control methods of the valves discussed in greater detail herein may be stored in memory in the controller executable by the processor. The controller 100, throttle 38, direct injector 50, valves (74, 78, 54, and 48), and the aforementioned sensors may be included in a control system 150.

Figure 2:
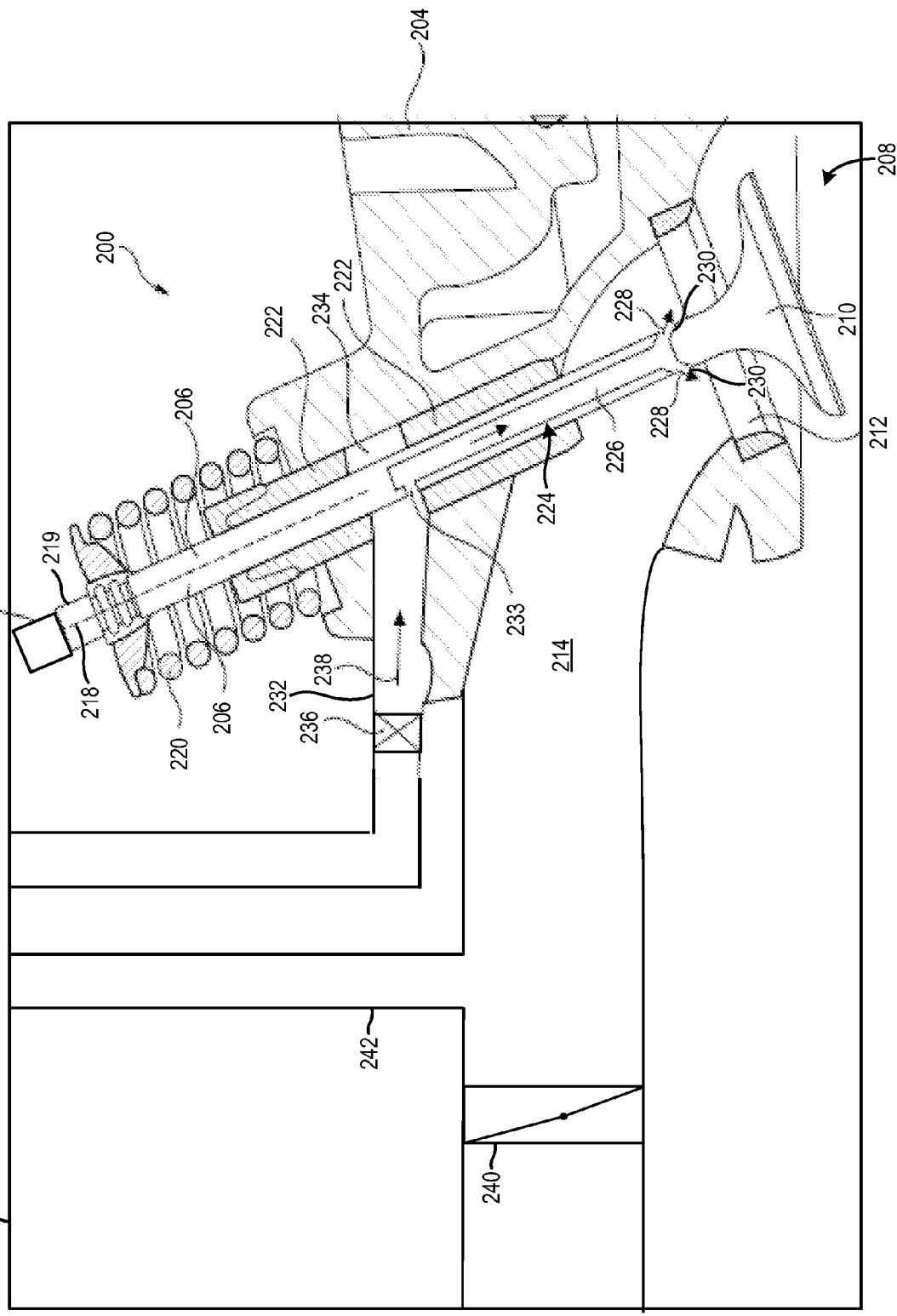
FIG. 2 shows an exemplary intake valve including an air supply passage extending through a valve stem.

FIG. 2 schematically shows a cross-sectional view of an example intake valve 200 in an internal combustion engine 202. The intake valve 200 may be an example of the intake valve 44 shown in FIG. 1, and the engine 202 may be an example of the engine 10, shown in FIG. 1.

The intake valve 200 which is arranged in a cylinder head 204 includes a valve stem 206. The intake valve may function as a control element and may be a lifting valve such as a poppet valve.

On that end of the valve stem 206 which faces toward a cylinder 208 there is arranged a valve head 210 which opens up or shuts off an inlet opening 212 of the cylinder 208. Specifically, the valve head 210 may seat and seal on a surface of the inlet opening in the closed position.

The intake valve 200 is movable between a valve closed position and a valve open position, wherein, in the valve open position, charge air is fed to the cylinder 208 via intake line 214 (e.g., intake manifold) and inlet opening 212.

As the camshaft 216, generically represented via a box, rotates, the intake valve 200 performs an oscillating lifting movement in the direction of its longitudinal axis 218. A cam follower element 219 is positioned between the camshaft 216 and the intake valve 200. A valve spring 220 is provided for preloading the intake valve 200 in the direction of the valve closed position. In the intake valve 200 shown in FIG. 2 a helical spring is used as the valve spring. However, the use of other types of springs in the valve has been contemplated. As shown, an air supply duct 224 is positioned below the valve spring 220 coupled to the valve stem 206.

The valve stem 206 is mounted so as to be displaceable in translational fashion in a bushing-like valve stem guide 222 which is fixed in the cylinder head 204, there is provided an air supply duct 224 which extends along the longitudinal axis 218 of the intake valve 200. The air supply duct 224 may be referred to as an intake valve air supply duct. The air supply duct 224 includes a main section 226 and two rectilinear sections 228 branching off the main section 226. The rectilinear sections 228 include outlets 230 opening into the intake line 214 adjacent to the cylinder 208. Thus the outlets 230 provide fluidic connection between the intake line 214 and the air supply duct 224. The rectilinear sections 228 are oriented toward the valve head 210, such that the sections 228 form an acute angle with the longitudinal axis 218 of the intake valve 200.

Air jets emerge from the rectilinear sections 228, which air jets are indicated by arrows and serve, during the charge exchange, for generating turbulence and thus for generating a charge movement.

The air supply duct 224, at its end facing away from the cylinder, fluidly connected to an intake system, such as the intake system 12 shown in FIG. 1, via a line 232 (e.g., supply line). The air supply duct 224 includes an inlet 233 (e.g., air supply duct inlet).

The bushing-like valve stem guide 222 is in this case formed in two parts. The bushing-like valve stem guide portions are arranged spaced apart from one another such that an annular duct 234 running around the valve stem 206 is formed. The line 232 that branches off from the intake system opens into said annular duct 234, which annular duct supplies charge air to the air supply duct 224 via the inlet 233. The annular duct 234 ensures that, even if the intake valve 200 rotates, there is a fluidic connection between the line 232 and the air supply duct 224.

A shut-off element 236 (e.g., shut-off valve) in the line 232 serves for opening up the line 232 and supplying charge air, which originates from the intake system, to the air supply duct 224. Furthermore, by means of the shut-off element 236, the charge-air flow rate introduced into the air supply duct 224 via the line 232 can be metered, and the impetus of the air jets emerging from the sections 228 adjusted. Arrow 238 denotes the adjusted flow of intake air through the line 232.

The line 232 (e.g., supply line) may be fluidly connected to an intake passage downstream of a compressor and upstream of a throttle 240.

A high pressure (HP) EGR passage 242 is fluidly connected to the intake line 214 in the depicted example. However, in other examples the engine may not include an EGR system.

Figure 3:
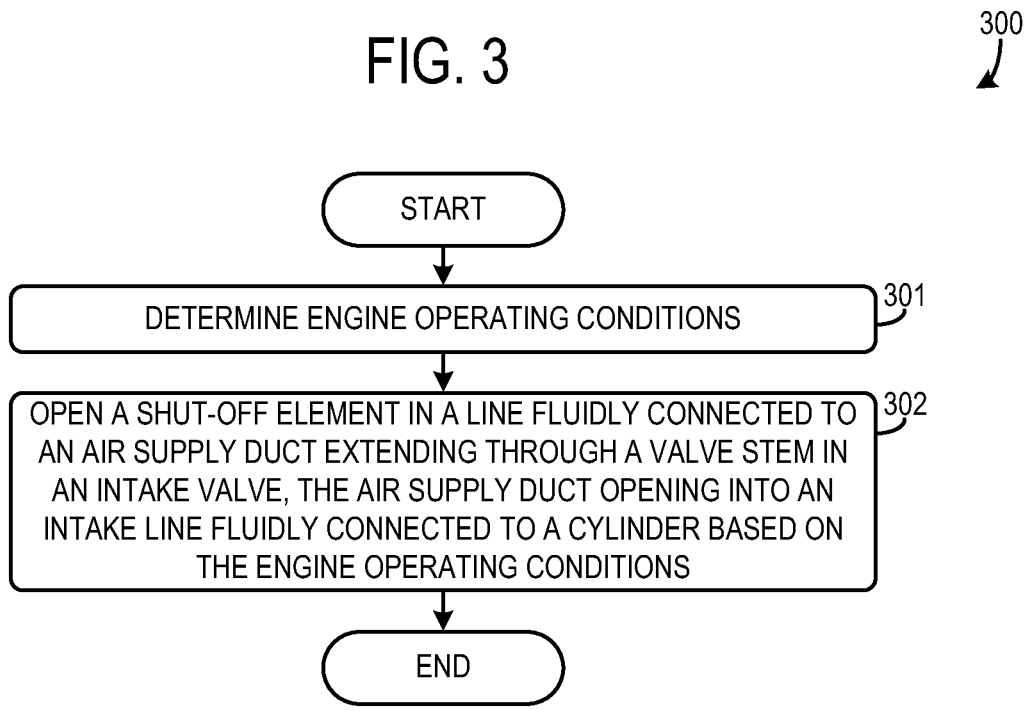
FIG. 3 shows a method for operation of an internal combustion engine.

FIG. 3 shows a method 300 for operation of an internal combustion engine. The method 300 may be implemented by the engine and system described above with regard to FIGS. 1 and 2. However in other examples the method 300 may be implemented by other suitable engines and systems.

At 301 the method includes determining engine operating conditions. The engine operating conditions may include engine temperature, engine speed, engine load, fuel injection flow rate, manifold air pressure, etc.

Next at 302 the method includes opening a shut-off element in a line fluidly connected to an air supply duct extending through a valve stem in an intake valve, the air supply duct opening into an intake line fluidly connected to a cylinder based on the engine operating conditions. In this way, air may be directed through a duct in an intake valve stem which generates turbulence (e.g., air swirling) to promoting mixing of intake air and fuel inside the cylinder to increase combustion efficiency and reduce engine emissions.

Figure 4:
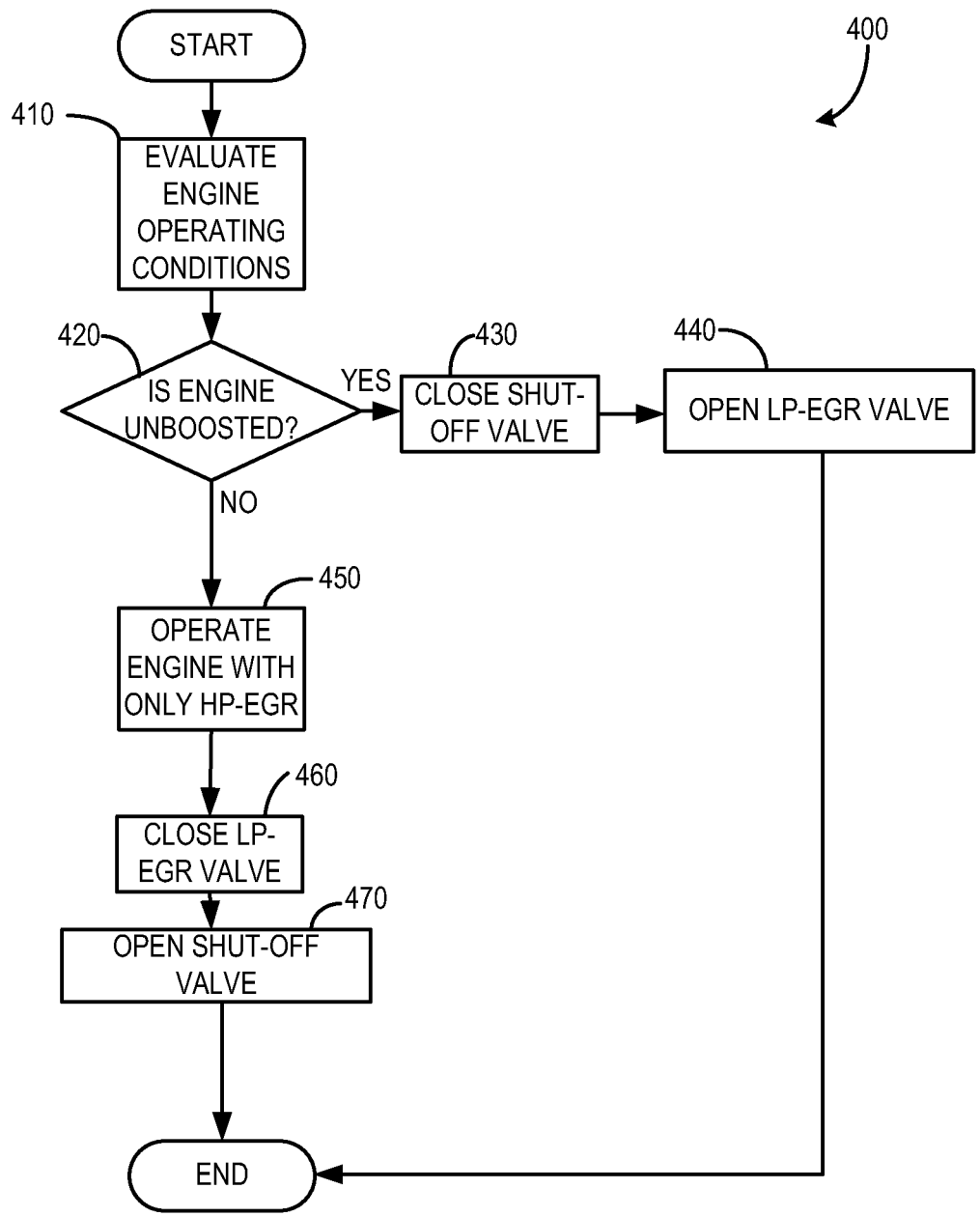
FIG. 4 shows a flow chart depicting a method for opening the shut-off valve.

Now turning to FIG. 4, an example method 400 for determining the operation of the engine with either the shut-off valve or the low pressure exhaust gas recirculation (LP-EGR) system is provided. The method 400 may be implemented by the engine and system described above with regard to FIGS. 1 and 2. However in other examples the method 400 may be implemented by other suitable engines and systems.

At 410 the method 400 determines the engine operating conditions. The engine operating conditions may include engine speed, engine load, vehicle speed, and/or engine temperature. These variables may be measured and/or estimated from the sensors such as the throttle position sensor, pedal position sensor, etc.

At 420, the method 400 determines the engine boost conditions. Engine boost refers to the amount by which the intake manifold pressure exceeds atmospheric pressure. This increase in pressure is achieved through the forced induction of the turbocharger, which rotates the compressor based on the output of the exhaust gas that rotates the turbine of the turbocharger. During high engine load and speed the turbocharger has a boosted engine in which the input manifold pressure exceeds that of the atmospheric pressure. During the operation of the boosted engine it may be desirable to create turbulent intake air flow to increase combustion efficiency. This may be achieved partly by opening the shut-off valve. If the engine determines that the engine is unboosted the method 400 continues to 430, otherwise the method 400 continues to 450.

At 430, the shut-off valve is closed. After closing the shut-off valve the method 400 then continues to 440. At 440 the method includes opening the LP-EGR valve to operate the engine with LP-EGR. The method may further include LP-EGR rate based on engine speed and load when the LP-EGR valve is opened. Further, the engine spark may be adjusted based on the engine operating conditions. The method includes at 450 operating the engine with only HP-EGR flow.

At 460, the LP-EGR valve is closed. The LP-EGR must be closed because the contaminants may clog the shut-off valve and this may hinder the operation of the engine. After closing shut-off valve the method 400 continues to 470.

At 470, the method includes opening the shut-off valve. Specifically in one example, the method may determine the aperture size and duration of opening of the shut-off valve based on engine speed and load. The shut-off valve adjustment may assist the engine to reach target speeds based on the users torque demand.

Figure 5:
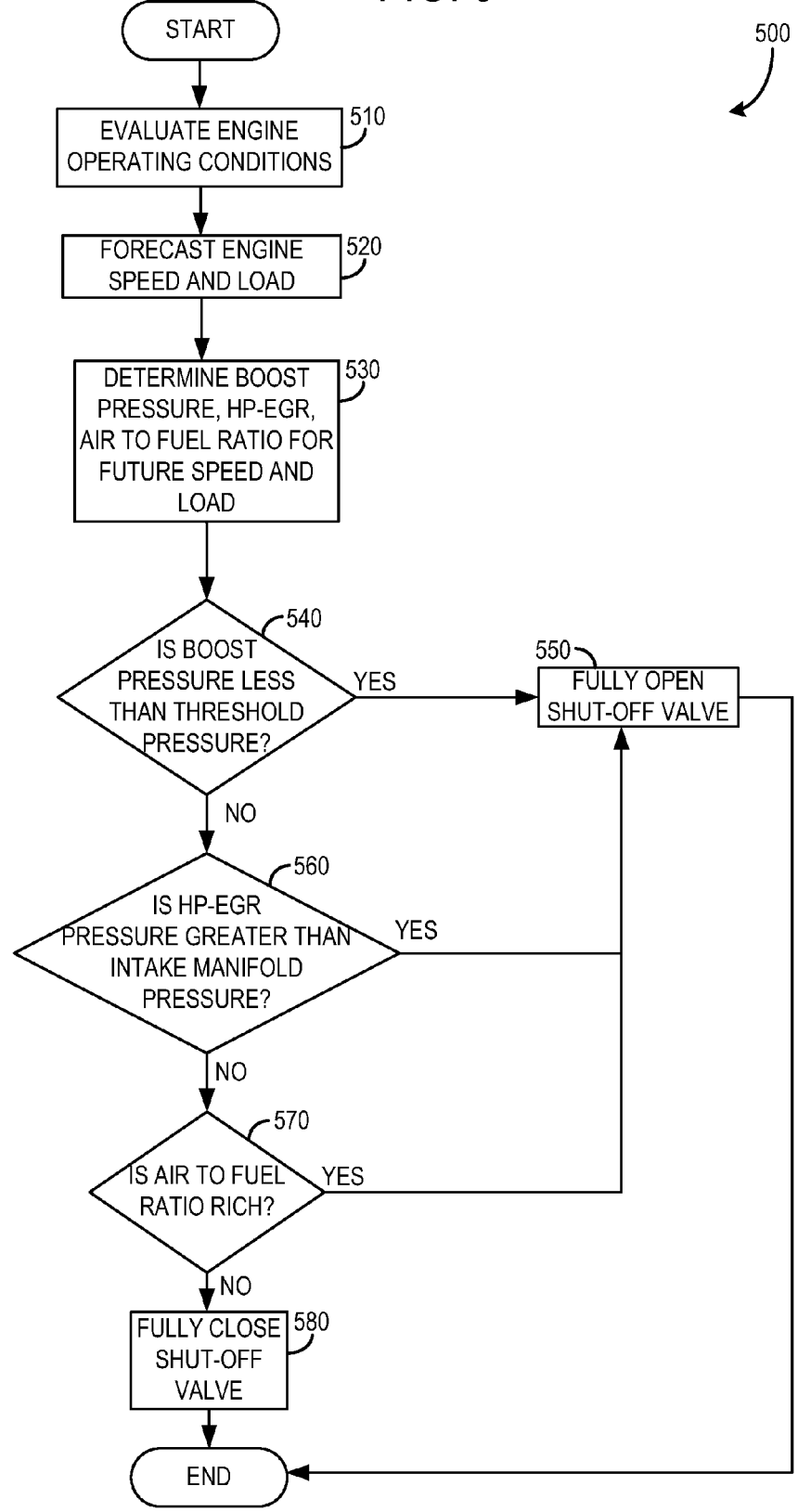
FIG. 5 shows a flow chart depicting a method for determining the conditions when the shut-off valve is opened.

Now turning to FIG. 5, an example method 500 is provided to control the air flow through the shut-off valve based on parameters such as engine boost, the high pressure EGR and the desired air to fuel ratio. Based on these parameters the shut-off valve may be either open or closed. In some embodiments the shut-off valve may be variably open depending upon the fluctuation of the parameters, it may also include a variable timing aspect that may be a function of both aperture size and time. The method 500 may be implemented by the engine and system described above with regard to FIGS. 1 and 2. However in other examples the method 500 may be implemented by other suitable engines and systems.

At 510 the method determines the engine operating conditions. Engine operating conditions may include engine speed, engine load, vehicle speed, and/or engine temperature. These variables may be measured and/or estimated from the sensors such as the throttle position sensor, pedal position sensor, etc.

At 520, the future engine speed and load are forecasted, to predict the change in the desired engine boost, the high pressure EGR rate and the desired air to fuel ratio. The engine speed and load may be forecasted in a plurality to methods, including pedal position, the future gear change in the transmission, etc.

At 530 the engine boost, high pressure EGR and air to fuel ratio are determined based on the forecast, these parameters are set to a threshold level which will determine the opening of the shut-off valve. Based on the comparison between the threshold parameter values and the current parameter values the shut-off valve is either fully opened or closed. In some embodiment the shut-off valve may not be limited to being either fully open or fully closed and may have variable valve opening and timing.

At 540, the boost pressure is compared to the desired threshold pressure that is needed for the engine speed and load. If the intake manifold pressure is determined to be less than the threshold pressure desired then the method proceeds to 550, otherwise the method proceeds to 560.

At 550, the shut-off valve is opened for a selected duration, until the desired parameters have attained the threshold value. Further once the parameters threshold values have been attained the method then may end.

At 560, the HP-EGR pressure is compared to the intake manifold pressure, if the intake manifold pressure is less than the high pressure exhaust gas then opening the shut-off valve, effectively increases the pressure by increasing the amount of air entering the combustion chamber, the pressure is also increased by creating a turbulent air flow. If the intake manifold pressure is less than the exhaust pressure the method proceeds to 550. However, if the intake manifold pressure is greater than or equal to the high pressure exhaust gas, then the method proceeds to 570.

At 570, the air to fuel ratio is determined, which is defined to be the mass of the air to the mass of the fuel. This ratio must be "lean" during the operation of a boosted engine, which in the art refers to a specific ratio where the mass of the air is significantly more than fuel. The lean mixture tends to a high temperature during combustion, which in a boosted engine provides greater torque for increased engine load and speed. A "rich" air to fuel ratio is not desired during a boosted engine. If it is determined that the fuel to air ratio is lean then the method proceeds to 580, otherwise the method proceeds to 550. At 580, the method includes closing the shut-off valve.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
   at least one cylinder head;
   at least one cylinder which has at least one inlet opening fluidly connected to an intake system configured to generate charge air, and a valve assembly comprising a lifting valve for each inlet opening and comprising a valve actuating device for actuating the at least one lifting valve, wherein the valve actuating device comprises at least one overhead camshaft with at least one cam;

where each lifting valve has a valve stem, on whose end facing toward the cylinder there is arranged a valve head corresponding to the inlet opening and whose other end faces toward the valve actuating device and which is mounted so as to be displaceable in translational fashion in a bushing-like valve stem guide such that the valve, when actuated and during rotation of the camshaft, performs an oscillating lifting movement in a direction of its longitudinal axis between a valve closed position and a valve open position so as to open up and close off the inlet opening; and where in the valve stem of at least one valve, there is provided an air supply duct which extends in a main section along the longitudinal axis of the valve, wherein, at a cylinder-side end of the air supply duct, at least one rectilinear section of the air supply duct branches off and emerges from the valve, and the air supply duct is, toward an end facing away from the cylinder, fluidly connected to the intake system via a line, and where a throttle flap is arranged in the intake system and the line branches off from the intake system upstream of the throttle flap;

a high pressure EGR passage coupled to an exhaust passage and coupled to an intake line downstream of the throttle flap; and a shut-off element provided in the line and a controller, the controller with instructions for:

responsive to an unboosted engine condition, closing the shut-off element.

2. The internal combustion engine of claim 1, where the air supply duct include at least two rectilinear sections branching off from the main section.

3. The internal combustion engine of claim 1, where the rectilinear section of the air supply duct is of rectilinear form.

4. The internal combustion engine of claim 1, where the rectilinear section of the air supply duct is oriented toward the valve head, such that the rectilinear section forms an acute angle with the longitudinal axis of the valve.

5. The internal combustion engine of claim 1, further comprising the controller with instructions for:

responsive to a boosted engine condition, operating the engine with only high pressure EGR.

6. The internal combustion engine of claim 1, where a filter is arranged in the intake system and the line branches off from the intake system downstream of the filter.

7. The internal combustion engine of claim 1, where the bushing-like valve stem guide has at least one passage, wherein the line is at least connectable via said at least one passage to the air supply duct.

8. The internal combustion engine of claim 1, wherein the bushing-like valve stem guide is formed in two parts, wherein the two valve stem guide parts are arranged spaced apart from one another such that an annular duct running around the valve stem is formed, wherein the line opens into said annular duct.

9. The internal combustion engine of claim 1, wherein each valve is equipped with a valve spring which preloads the valve in a direction of the valve closed position.

10. The internal combustion engine of claim 1, further comprising at least one cam follower element for each valve, wherein each cam follower element is arranged in a force flow between the camshaft and the associated valve.

11. The internal combustion engine of claim 1, wherein a ventilation line opens into the intake system.

12. The internal combustion engine as claimed in claim 11, where the ventilation line opens into the intake system upstream of a point at which the line branches off from the intake system.

13. A method for operating an internal combustion engine comprising:

opening a shut-off element in a line responsive to a boost pressure less than a threshold;

where the line branches off from an intake system upstream of a throttle flap arranged in the intake system, and where the line is fluidly connected to an air supply duct extending through a valve stem in an intake valve, the air supply duct opening into an intake line fluidly connected to a cylinder.

14. An intake system for an internal combustion engine comprising:

an intake manifold fluidly connected to a cylinder;

an intake valve coupled to the cylinder having an air supply duct longitudinally extending through a portion of a valve stem and having an outlet opening into the intake manifold and an inlet fluidly connected to a supply line fluidly connected to an intake passage downstream of a compressor and upstream of a throttle flap arranged in the intake system;

a shut-off valve positioned in the supply line configured to adjust a flow of gas through the supply line;

a high pressure EGR passage coupled to an exhaust passage upstream a turbine and coupled to an intake passage downstream a throttle;

a low pressure EGR passage coupled to the intake passage upstream of the inlet of the supply line and coupled to the exhaust passage downstream of the turbine;

a low pressure EGR valve coupled to the low pressure EGR passage; and a controller with instructions for:

responsive to a boosted engine condition, operating the engine with only high pressure EGR, closing the low pressure EGR valve, and opening the shut-off valve: and responsive to an unboosted engine condition, closing the shut-off valve, and opening the low pressure EGR valve.

15. The intake system of claim 14, where the air supply duct includes a plurality of outlets positioned adjacent to an end of the valve configured to seal on a cylinder valve seat.

16. The intake system of claim 14, further comprising a crankcase ventilation line coupled to the intake passage upstream of the inlet of the supply line.

17. The intake system of claim 14, where the air supply duct is positioned below a valve spring coupled to the valve stem.

* * * * *